United States Patent
Ben-Zeev et al.

(10) Patent No.: US 7,322,696 B2
(45) Date of Patent: Jan. 29, 2008

(54) CUSTOMIZED LENS, AND SYSTEM AND METHOD OF PRODUCING THEREOF

(75) Inventors: Giora Ben-Zeev, Kibbutz Shamir (IL); Dan Katzman, Givat Ela (IL); Haim Hainebach, Kibbutz Shamir (IL); Yuval Carmon, Tivon (IL)

(73) Assignee: Shamir Optical Industry, Upper Galilee (IL)

( * ) Notice: Subject to any disclaimer, the term of this patent is extended or adjusted under 35 U.S.C. 154(b) by 105 days.

(21) Appl. No.: 11/107,972

(22) Filed: Apr. 18, 2005

(65) Prior Publication Data

US 2005/0231683 A1   Oct. 20, 2005

Related U.S. Application Data

(60) Provisional application No. 60/562,993, filed on Apr. 19, 2004.

(51) Int. Cl.
*G02C 7/02* (2006.01)
(52) U.S. Cl. .................. 351/177; 351/159; 351/178; 351/209
(58) Field of Classification Search .............. 351/177
See application file for complete search history.

(56) References Cited

U.S. PATENT DOCUMENTS

| | | | | |
|---|---|---|---|---|
| 3,623,800 A | * | 11/1971 | Volk | 351/169 |
| 5,963,300 A | * | 10/1999 | Horwitz | 351/209 |
| 6,318,859 B1 | | 11/2001 | Baudart et al. | |
| 7,066,597 B2 | * | 6/2006 | Miller et al. | 351/169 |
| 2004/0169820 A1 | * | 9/2004 | Dai et al. | 351/246 |
| 2005/0213027 A1 | * | 9/2005 | Blum et al. | 351/159 |
| 2006/0238707 A1 | * | 10/2006 | Elvesjo et al. | 351/209 |
| 2006/0239670 A1 | * | 10/2006 | Cleveland | 396/51 |

* cited by examiner

*Primary Examiner*—Jessica Stultz
(74) *Attorney, Agent, or Firm*—Pearl Cohen Zedek Latzer LLP

(57) ABSTRACT

Embodiments of the present invention provide a system and method of producing a customized spectacle lens. According to some exemplary embodiments, a method of producing a customized spectacle lens for use in a personalized viewing environment, e.g., a personalized short-distance viewing environment, a personalized long-distance viewing environment, or a personalized mixed-distance viewing environment, may include determining a personalized power profile of an intended user based on at least a far vision prescription of the user, a near vision prescription of the user, and customized values of a personalized gaze angle and a personalized distance of one or more control points in the viewing environment, the one or more control points corresponding to one or more objects in the viewing environment; and generating target surface data suitable for producing the customized spectacle lens based on the personalized power profile. Other embodiments are described and claimed.

25 Claims, 5 Drawing Sheets

CUSTOMIZED LENS, AND SYSTEM AND METHOD OF PRODUCING THEREOF

CROSS-REFERENCE TO RELATED APPLICATIONS

This application claims the benefit of U.S. Provisional Patent Application 60/562,993, filed Apr. 19, 2004, the disclosure of which is incorporated herein by reference in its entirety.

FIELD OF THE INVENTION

The invention relates generally to optical elements and, more particularly, to multi-focal optical elements, e.g., lenses, and to systems and methods of producing such elements.

BACKGROUND OF THE INVENTION

Optical elements are pieces of substantially transparent material having surfaces that reflect or refract light, such as mirrors, lenses, splitters and collimators Optical elements are used in a variety of applications, including telescopes, microscopes, cameras and spectacles Optical elements can be characterized by their optical properties and their surface optical properties. Optical properties such as astigmatism, optical power and prism describe how a wavefront of incident light is deformed as it passes through the optical element. Surface optical properties such as surface astigmatism, surface optical power and the gradients of the surface astigmatism and surface optical power describe geometrical properties of a surface of the optical element. The optical properties may be related to the surface optical properties.

Multifocal optical elements have more than one optical power. For example, bifocal lenses have two subregions, each with a different optical power. Bifocal spectacle lenses can be used, for example, to correct myopia (short-sightedness) in one subregion, and presbyopia (the loss of the eye's ability to change the shape of its lens) in the other subregion. Many people find it uncomfortable to wear bifocal spectacle lenses, because of the abrupt change in optical power from one subregion to the other. This led to the development of progressive spectacle lenses, which are multifocal lenses in which the optical power varies smoothly from one point to another on the lens.

The surface optical power at any point on the surface of an optical element is defined by the mean curvature of the surface. A progressive lens has varying optical power, so it has variable curvature, and is by definition aspherical. However, since the surface of the progressive lens, or at least a substantial part of it, is by definition aspherical, it has two distinct principal curvatures $\kappa_1$ and $\kappa_2$ at many points. The surface astigmatism at any point on the surface of an optical element is defined by the absolute value of the difference in the principal curvatures $\kappa_1$ and $\kappa_2$.

The definitions of the mean curvature H, Gaussian curvature G, and principal curvatures $\kappa_1$ and $\kappa_2$ of a surface $f$ at the point (x,y) are given in the following Equations 1A-1D:

$$H = \frac{1}{2} \frac{\left(1+\left(\frac{\partial f}{\partial x}\right)^2\right)\left(\frac{\partial^2 f}{\partial y^2}\right) - 2\left(\frac{\partial f}{\partial x}\right)\left(\frac{\partial f}{\partial y}\right)\left(\frac{\partial^2 f}{\partial x \partial y}\right) + \left(1+\left(\frac{\partial f}{\partial y}\right)^2\right)\left(\frac{\partial^2 f}{\partial x^2}\right)}{\left(1+\left(\frac{\partial f}{\partial x}\right)^2 + \left(\frac{\partial f}{\partial y}\right)^2\right)^{3/2}}, \quad (1A)$$

$$G = \frac{1}{2} \frac{\left(\frac{\partial^2 f}{\partial x^2}\right)\left(\frac{\partial^2 f}{\partial y^2}\right) - \left(\frac{\partial^2 f}{\partial x \partial y}\right)^2}{\left(1+\left(\frac{\partial f}{\partial x}\right)^2 + \left(\frac{\partial f}{\partial y}\right)^2\right)^2}, \quad (1B)$$

$$\kappa_1 = H + \sqrt{H^2 - G}, \quad (1C)$$

$$\kappa_2 = H - \sqrt{H^2 - G}. \quad (1D)$$

Since the early days of designing progressive lenses, the main design goals have been to achieve:
a) gently varying optical power;
b) minimal astigmatism;
c) reduction of a variety of optical aberrations such as skew distortion, binocular imbalance, etc.

Many different methods have been proposed to achieve these goals. One such method is based on a base curve (meridian) runs from the upper part of the lens to its lower part. The lens surface is defined along the meridian such that the curvature varies gradually (and hence the optical power varies). Along the meridian itself, the principal curvatures $\kappa_1$ and $\kappa_2$ satisfy $\kappa_1 = \kappa_2$. The lens surface is extended from the meridian horizontally in several different methods. Explicit formulas are given for the extensions from the meridian. Maitenaz obtains an area in the upper part of the lens, and another area in the lower part of the lens in which there is a rather stable optical power. Furthermore, the astigmatism in the vicinity of the meridian is relatively small.

Some designs for progressive lenses explicitly divide the progressive lens into three zones: an upper zone for far vision, a lower zone for near vision, and an intermediate zone that bridges the first two zones. The upper and lower zones provide essentially clear vision. Many designs use spherical surfaces for the upper and lower zones. A major effort in the design process is to determine a good intermediate zone.

Some design methods use explicit formulae to define the intermediate zone, to achieve a relatively smooth transition area between the upper and lower zones. In one existing method, the lens designer defines the value of the lens surface in the intermediate zone at a number of special points, which may relate to lens-related characteristics, e.g., a size of a frame intended to accommodate the lens, and/or a refraction index of the material of the lens. The full surface is then generated by the method of splines. The designer adjusts the value of the lens surface at the special points in order to improve the properties of the generated surface.

In yet another existing method, a base surface function is used to define a progressive lens having an upper zone for far vision, a lower zone for near vision, and an intermediate zone. According to this method, an improved progressive lens is calculated by optimizing a function defined over a subregion of the lens, where the optimized function is to be added to the base surface function.

The lens may be produced using different methods, for example, a freeform manufacturing process. The free-form manufacturing process may include using a Computer Numerically Controlled (CNC) milling apparatus, which may be capable of producing a lens having a desired surface geometry, at a relatively high degree of accuracy, based on input data defining the desired lens surface geometry.

The Free-form manufacturing process may include a generating stage and a polishing stage. The generating stage may include lathing/grinding a semi finished blank to produce an intermediate surface. Since the free-form process may be used for producing any desired optical surface at a relatively high degree of accuracy, the freeform manufacturing process may be applied to a spherical blank, which may be less expensive than progressive semi-finished blanks, e.g., such as those used in other lens manufacturing processes. In addition, a relatively small number of different blanks may be used for producing a relatively wide range of optical surfaces. The polishing stage may include polishing the intermediate surface in accordance with the required surface geometry and/or cosmetic requirements. The free-form process may enable using a relatively small number of polishing tools to produce a relatively wide range of optical surfaces.

SUMMARY OF EXEMPLARY EMBODIMENTS OF THE INVENTION

Spectacle lenses may be used in different viewing environments including long-distance viewing environments, for example, outdoor environments, as well as short-distance viewing environments, for example, indoor environments, e.g., the interior of an office or a home, and the like.

According to some exemplary embodiments of the invention, a user of a spectacle lens may be interested in viewing one or more particular objects in the viewing environment more clearly than other objects in the viewing environment. For example, in a short-distance viewing environment, e.g., an interior space, the user may desire to view with improved clarity one or more objects, for example, objects that are frequently viewed and/or used, e.g., a keyboard and/or display of a computer.

According to some exemplary embodiments of the invention, different users may have different personal viewing preferences. The personal viewing preferences may be related, for example, to different viewing environments, to different objects in a viewing environment, and/or to different distances and/or different viewing habits, e.g., the gaze angle and distance at which different users tend to view certain objects in the viewing environment. For example, a first personal short-distance viewing environment, e.g., an office space, may include a first object, e.g., a first display device, viewed by a first user at a first personalized distance and first personalized gaze angle; and a second object, e.g., a bookshelf or a file cabinet, viewed by the first user at a second personalized distance and a second personalized gaze angle. A second personal short-distance environment, may include a third object, e.g., a second display device, viewed by a user, e.g., the first user or a second user, at a third personalized distance and a third personalized angle of gaze; and the second object viewed by the user at a fourth personalized distance and a fourth personalized angle of gaze. Accordingly, a first optical lens characterized according to the personalized viewing environment of the first user, may be different from a second optical lens characterized according to the viewing requirements of the second user, e.g., even if the first and second users have the same far and/or near vision prescriptions. Furthermore, two different optical lenses may correspond to two different personalized viewing environments of a single user, e.g., for viewing in different sections of the viewing environment, for example, two different rooms, including different objects and/or the same objects at different distances and/or gaze angles.

Some exemplary embodiments of the invention include systems and/or methods of producing a customized optical lens, e.g., a customized multi-focal spectacle lens, for use in a personalized, e.g., short-distance, long distance or mixed-distance, viewing environment.

According to some exemplary embodiments of the invention, a method of producing the customized optical lens may include determining a personalized power profile of an intended user based on at least a far vision prescription of the user, a near vision prescription of the user, and customized values of a personalized gaze angle and a personalized distance of one or more control points in the viewing environment. The one or more control points may correspond to one or more objects, e.g., a computer display and/or a keyboard, in the viewing environment. The method may also include generating target surface data suitable for producing the customized spectacle lens based on the personalized power profile.

The customized optical lens according to some exemplary embodiments of the invention may have improved properties, for example, a lower level of optical aberrations, compared to non-customized multi-focal lenses, e.g., conventional multi-focal lenses.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
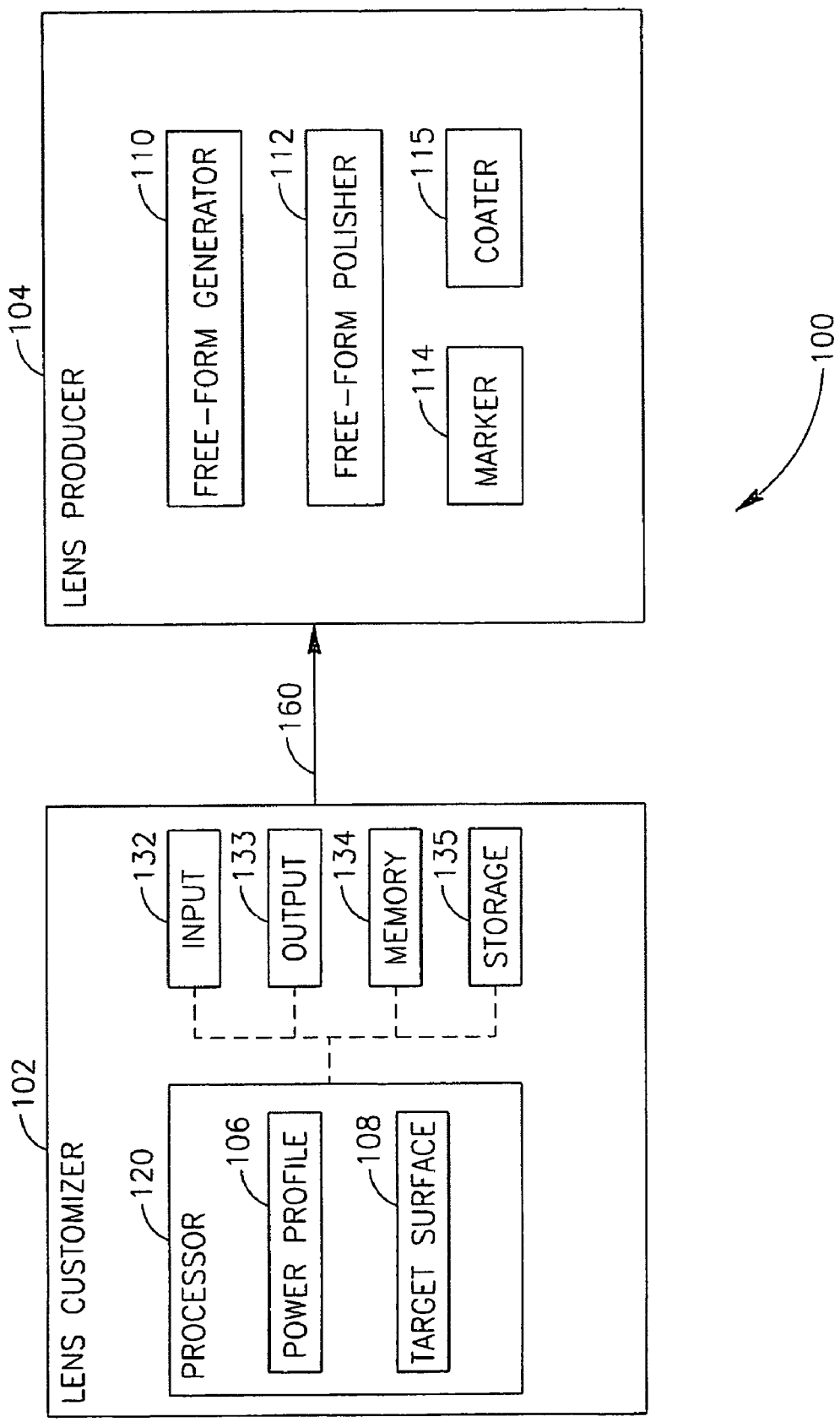
FIG. 1 is a schematic illustration of a system for producing a customized spectacle lens for use in a personalized viewing environment, in accordance with some exemplary embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Some portions of the following detailed are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the present invention may include apparatuses for performing the operations herein. These apparatuses may be specially constructed for the desired purposes, or they may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, a Dynamic RAM (DRAM), a Synchronous DRAM (SD-RAM), a Flash memory, a volatile memory, a non-volatile memory, a cache memory, a buffer, a short term memory unit, a long term memory unit, or any other type of media suitable for storing electronic instructions, and capable of being coupled to a computer system bus.

The processes presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Some exemplary embodiments of the invention include systems and/or methods of producing a customized optical lens, e.g., a customized multi-focal spectacle lens, for use in a personalized viewing environment, as described in detail below.

It will be appreciated that the phrase "personalized viewing environment" as used herein may refer to an interior or exterior area, region, field, space and/or domain, including one or more elements, objects, devices, and/or items intended to be viewed by one or more users at one or more individual distances and/or gaze angles.

It will be appreciated that the phrase "personalized short-distance viewing environment" as used herein may refer to a personalized viewing environment including one or more objects intended to be viewed by a user at a relatively short distance, e.g., a distance of no more than ten meters, from any given object in the personalized viewing environment; however, the invention is not limited in this respect, and any the limits of a short-distance viewing environment according to embodiments of the invention may be defined differently, e.g., to include larger distances as may be necessary. For example, the personalized short-distance viewing environment may include a bounded environment, e.g., one or more rooms of a home, an office, a store or any other defined interior or exterior area or space. In another example, the personalized short-distance viewing environment may include only a predetermined part of an open environment or a confined environment, e.g., part of a large or small room or hall, including one or more objects intended to be viewed by the user.

It will be appreciated that the phrase "personalized long-distance viewing environment" as used herein may refer to a personalized viewing environment including one or more objects intended to be viewed by a user at a relatively long distance, e.g., a distance of more than ten meters, from any given object in the personalized environment; however, the invention is not limited in this respect, and any the limits of a long-distance viewing environment according to embodiments of the invention may be defined differently, e.g., to include larger distances as may be necessary. For example, the personalized long-distance viewing environment may include an open environment, e.g., an outdoor environment. In another example, the personalized long-distance viewing environment may include only a predetermined part of a bounded environment, e.g., part of a large or small room or ball, including one or more objects intended to be viewed by the user at a relatively long distance.

It will be appreciated that the phrase "personalized mixed-distance viewing environment" as used herein may refer to a personalized viewing environment including one or more objects intended to be viewed by a user at a relatively long distance, e.g., a distance of more than ten meters; and one or more objects intended to be viewed by the user at a relatively short distance, e.g., of no more than ten meters. For example, the personalized mixed-distance viewing environment may include a driving environment intended to be viewed by a driver of a vehicle, e.g., a car, bus or truck. The driving environment may include, for example, one or more objects intended to be viewed by the driver at a relatively short distance, e.g., a dashboard of the vehicle, and/or one or more mirrors of the vehicle; and one or more objects to be viewed by the driver at a relatively long distance, e.g., a road portion in front of the vehicle and/or a road or street sign.

A first personalized short-distance viewing environment may include, for example, an office space, e.g., a personal work area or room, including a computer display ("monitor") intended to be viewed by a user of a customized optical lens at a first distance and a first gaze angle; and a computer keyboard ("keyboard") intended to be viewed by the user at a second distance and a second gaze angle. The personalized viewing environment may optionally be characterized by an object in the environment, e.g., a wall of the office, which is farthest from the user compared to other objects in the environment, e.g., as described below. Different personalized viewing environments may be defined for a single user. For example, a second personalized short-distance viewing environment may include at least some of the same objects of the first personalized viewing environment, e.g., the same monitor and/or keyboard in the same office space, wherein one or more of the objects are intended to be viewed by the user at distances and/or gaze angles different from the distances and/or gaze angles of the first personalized environment, e.g., as described below.

Reference is made to FIG. 1, which schematically illustrates a system 100 for producing a customized spectacle lens for use in a personalized viewing environment, in accordance with some exemplary embodiments of the present invention.

According to the exemplary embodiments of FIG. 1, system 100 may include a lens customizing module 102 to generate target surface data suitable for producing a customized spectacle lens for use in a personalized viewing environment, as described in detail below. System 100 may also include a lens production module 104 to produce the customized spectacle lens based on the target surface data, as described in detail below.

According to some exemplary embodiments, customizing module 102 may include a processor 120, an input unit 132, an output unit 133, a memory unit 134, and/or a storage unit 135. Customizing module 104 may additionally or alternatively include other suitable hardware components and/or software components.

According to some exemplary embodiments of the invention, processor 120 may include a Central Processing Unit (CPU), a Digital Signal Processor (DSP), a microprocessor, a host processor, a plurality of processors, a controller, a chip, a microchip, or any other suitable multi-purpose or specific processor or controller. Input unit 132 may include, for example, a keyboard, a mouse, a touch-pad, or other suitable pointing device or input device. Output unit 133 may include, for example, a Cathode Ray Tube (CRT) monitor, a Liquid Crystal Display (LCD) monitor, or other suitable monitor or display unit. Storage unit 135 may include, for example, a hard disk drive, a floppy disk drive, a Compact Disk (CD) drive, a CD-Recordable (CD-R) drive, or other suitable removable and/or fixed storage unit Memory unit 134 may include, for example, a RAM, a ROM, a DRAM, a SD-RAM, a Flash memory, a volatile memory, a non-volatile memory, a cache memory, a buffer, a short term memory unit, a long term memory unit, or other suitable memory units or storage units.

According to some exemplary embodiments of the invention, memory 134 and/or storage unit 135 may store one or more instructions readable by processor 120, that when executed by processor 120 may result in a power profile module 106 to determine a personalized power profile of an intended user based on at least a far vision prescription of the user, a near vision prescription of the user, and customized values of at least one personalized gaze angle and personalized distance of one or more control point in the personalized viewing environment, as described in detail below. Memory 134 and/or storage unit 135 may also store one or more instructions readable by processor 120, that when executed by processor 120 may result in a target surface module 108 to generate the surface data based on the personalized power profile, e.g., using any suitable target surface calculation method as is known in the art.

Aspects of the invention are described herein in the context of an exemplary embodiment of a power profile module, e.g., power profile module 106, and a target surface module, e.g., target surface module 108, which may be implemented as separate modules of lens customizing module, e.g., lens customizing module 102. However, it will be appreciated by those skilled in the art that, according to other embodiments of the invention, the power profile module and the target surface module may be implemented in any desired combination.

According to some exemplary embodiments of the invention, the target surface data may be transferred to lens production module 106 via a suitable data link 160.

According to some exemplary embodiments of the invention, lens production module 104 may be able to produce the customized lens by applying the target surface data to an initial lens design having one or more optical surfaces, e.g., wherein the number of the optical surfaces of the initial lens design is at least equal to the number of the control points used for determining the personalized power profile, as described below.

According to some exemplary embodiments of the invention, lens production module 104 may include a freeform lens production module. For example, lens production module may include a freeform generator 110, a freeform polisher 112, a marker 114 and/or a coater 115, as are known in the art. According to other embodiments of the invention, lens production module 104 may include any suitable hardware and/or software to produce the customized lens based on the target surface data.

Aspects of the invention are described herein in the context of an exemplary embodiment of a lens customizing module, e.g., lens customizing module 104, and a lens production module, e.g., lens production module 106, which may be implemented as separate modules of a system for producing a customized lens, e.g., system 100. However, it will be appreciated by those skilled in the art that, according to other embodiments of the invention, the lens customizing module and the lens production module may be implemented in any desired combination. For example, the lens customizing module and the lens production module may be combined together into a single lens customization and production device, apparatus or system.

Figure 2:
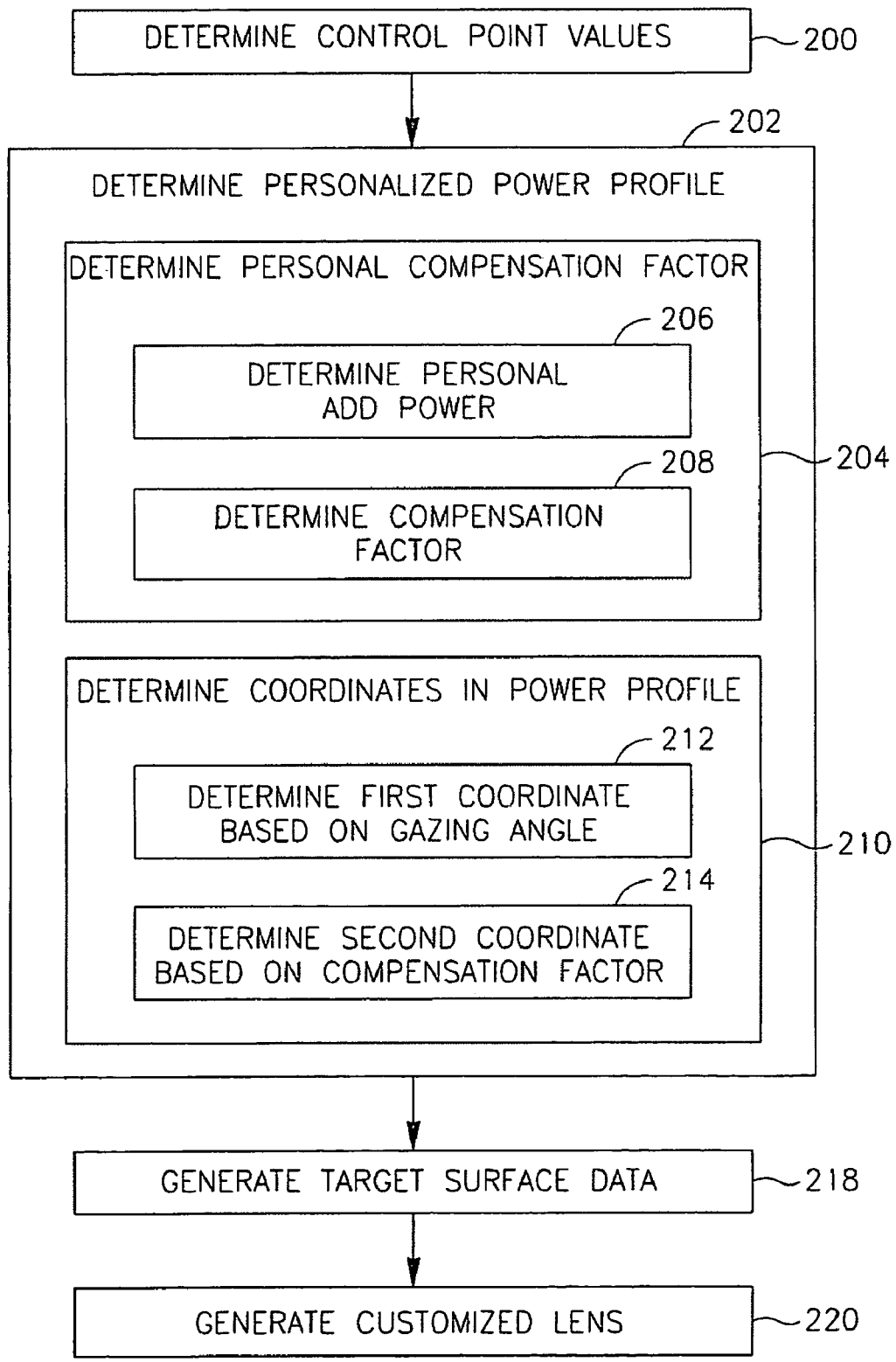
FIG. 2 is a schematic flow chart of a method of producing a customized spectacle lens for use in a personalized viewing environment, in accordance with some exemplary embodiments of the invention.

Reference is made to FIG. 2, which schematically illustrates a method of producing a customized spectacle lens for use in a personalized viewing environment, in accordance with some exemplary embodiments of the invention.

As indicated at block 200, the method may include determining one or more personalized gaze angles and personalized distances of one or more control points in the personalized viewing environment, respectively. For example, the one or more personalized gaze angles and distances of the control points may be measured, e.g., by an optometrist and/or an intended user of the lens using suitable measurement equipment, and the control points may correspond to one or more objects in the personalized viewing environment. The one or more objects may include, for example, one or more objects which the user intends to view in the personalized environment. For example, the personalized viewing environment may include a short-distance environment, e.g., an office space, a home, a room in a home, or any other suitable environment. The one or more objects may include, for example, a television, a computer display, a keyboard, a bookshelf, a file cabinet, a blackboard, a whiteboard, a posting board, a note pad, an/or any other desired object, item, element, or entity, e.g., a person, which is generally located at a known distance, e.g., a short distance, for example, less than ten meters, from the user. Customized values of one or more personalized gaze angles and personalized distances corresponding to one or more of the control points may be measured and/or evaluated, e.g., by the optometrist and/or the user. In other embodiments of the invention, the personalized viewing environment may include any other desired environment, for example, a long-distance viewing environment or a mixed-distance viewing environment, e.g., as described below, and the measured personalized viewing distances and gaze angles of the control points may correspond to objects located farther, more than ten meters, from the user.

The customized values of the one or more personalized gaze angles and/or personalized distances may be determined and/or evaluated in any desired method. The personalized gaze angles and/or personalized distances may be determined or evaluated by the optometrist, the user, any other person, and/or any suitable device or system One or more of the personalized gaze angles and/or personalized distances may be measured using any suitable measuring device, e.g., a ruler and/or a suitable eye-tracking device as are known in the art. For example, a personalized gaze angle of a user in relation to an object may be derived from a first measurement of a distance between the eyes of the user and the object, and a second measurement of a horizontal distance between the user and the object.

In one demonstrative embodiment of the invention, one or more of the personalized gaze angles and/or distances may be determined in relation to the environment, e.g., an office room, intended to be viewed by the user of the customized lens. In another embodiment of the invention, one or more of the personalized gaze angles and/or personalized distances may be determined in relation to a configurable environment simulating the environment intended to be viewed by the user of the customized lens. The configurable environment may include, for example, a configurable office environment including a desk, a monitor, a keyboard, a file cabinet and/or any other desired object, which may be selectively located in different distances and/or gaze angles with relation to the user.

As indicated at block 202, the method may include determining a personalized power profile of the intended user based on at least a far vision prescription of the user, denoted $P_{far}$; a near vision prescription of the user, denoted $P_{near}$; and the customized values of the personalized gaze angles and personalized distances of the control points, e.g., as described in detail below. Determining the personalized power profile of the intended user may include, for example, using a power profile module, e.g., power profile module 106 as described above with reference to FIG. 1. For example, input date including at least the far vision prescription of the user, the near vision prescription of the user, and/or the customized values of the personalized gaze angles and personalized distances of the control points may be provided, e.g., by the optometrist and/or the user, to lens customizing module 102, e.g., using input unit 132. Power profile module 106 may then determine the personalized power profile based on the input data.

As indicated at block 204, determining the personalized power profile may include determining a personalized compensation factor, denoted $f_P$, e.g., based on the far vision prescription and the near vision prescription of the user. For example, power profile module 106 as described above with reference to FIG. 1, may be able to determine the personalized compensation factor, e.g., based on the input data.

As indicated at block 206, determining the personalized compensation factor may include determining a personal add power of the user, denoted $P_{add}$, for example, by determining a difference between the near vision prescription and the vision prescription of the user, e.g., according to the following equation:

$$P_{add} = P_{near} - P_{far} \quad (1)$$

For example, power profile module 106, as described above with reference to FIG. 1, may be able to determine the personal add power of the user, e.g., based on the input data.

As indicated at block 208, determining the personalized compensation factor may also include determining the personalized compensation factor as a ratio between the personal add power and a full accommodation level, e.g., a full accommodation level of 2.5 Dioptre (D) as is known in the art. For example, the personalized compensation factor may be determined according to the following equation:

$$f_P = \begin{cases} (P_{add})/(2.5 \text{ Dioptre}) & P_{add} \le 2.5 \text{ Dioptre} \\ 1 & P_{add} > 2.5 \text{ Dioptre} \end{cases} \quad (2)$$

For example, power profile module 106 as described above with reference to FIG. 1, may be able to determine the personalized compensation factor, e.g., based on the determined personal add power.

As indicated at block 210, determining the personalized power profile may also include determining first and second coordinates, denoted $x_i$ and $y_i$, respectively, defining a point in the personalized power profile corresponding to a control point, denoted $C_i(x_i, y_i)$, wherein i=1 . . . n, and wherein n denotes the number of the control points used for determining the personalized power profile. The coordinates $x_i$ and/or $y_i$, may be determined, for example, based on the personalized compensation factor and the customized values of the personalized gaze angles and the personalized distances. For example, power profile module 106 as described above with reference to FIG. 1, may be able to determine the coordinates $x_i$ and $y_i$, e.g., based on the determined personal compensation factor and the input data, as described below.

As indicated at block 212, determining the coordinates corresponding to the one or more control points may include determining the coordinate $x_i$ corresponding to a control point $C_i$ according to the value of a corresponding personalized gaze angle. For example, the coordinate $x_i$ corresponding to the control point $C_i$ may be determined to be equal to the value of the personalized gaze angle corresponding to the control point $C_i$.

As indicated at block 214, determining the coordinates corresponding to the one or more control points may include determining the coordinate $y_i$ corresponding to control point $C_i$ by multiplying an inverse of a personalized distance corresponding to the control point $C_i$ by the personalized compensation factor. The coordinate $y_i$ may also be referred to as a power add value corresponding to the control point $C_i$.

Accordingly, the coordinates of the point in the power profile corresponding to the control point $C_i$ may be determined using the following equation:

$$C_i(x_i, y_i) = (\text{Angle}_{Ci}), [1/\text{Distance}_{Ci}] * f_P) \qquad (3)$$

wherein $\text{Angle}_{Ci}$ and $\text{Distance}_{Ci}$ denote the personalized gaze angle and personalized distance values corresponding to control point $C_i$, respectively.

As indicated at block 218, the method may include generating target surface data suitable for producing the customized spectacle lens based on the personalized power profile. For example, target surface module 108 as described above with reference to FIG. 1, may be able to determine the target surface data, e.g., using any suitable computation method as is known in the art.

As indicated at block 220, the method may also include producing the customized spectacle lens based on the target surface data. Producing the customized spectacle lens may include, for example, using a lens production module, e.g., lens production module 104 as described above with reference to FIG. 1.

According to some exemplary embodiments of the invention, different personalized power profiles may be determined for different intended users and/or for different personalized viewing environment of a single intended user, e.g., as described below.

According to one exemplary embodiment of the invention, an intended user may have a far vision prescription of +0.5 D, and a near vision prescription of +2.5 D. The personalized viewing distance may include, for example, a personalized short-distance viewing environment. The personalized short-distance viewing environment may include, for example, an office room including a first control point corresponding to a keyboard intended to be viewed by the user at a personalized distance of 0.5 m, and a personalized gaze angle of −40°; a second control point corresponding to a monitor intended to be viewed by the user at a personalized distance of 0.67 m, and a personalized gaze angle of 0°; and a third control point corresponding to an object in the room, e.g., a wall, intended to be viewed by the user at a personalized distance of 3 m, and a personalized gaze angle of +30°. The third control point may correspond, for example, to an object in tended to be located relatively far from the intended user, e.g., compared to other objects in the personalized viewing environment.

Accordingly, the personal add power of the intended user may be determined to be +2 D, e.g., using Equation 1. The personalized compensation factor of the intended user may be determined to be 0.8, e.g., using Equation 2. The values of the three control points $C_1(x_1, y_1)$, $C_2(x_2, y_2)$, and $C_3(x_3, y_3)$ may be determined, e.g., using Equation 3. For example, the following values may be determined for the three control points:

$$C_1(x_1, y_1) = (-40, 1.6)$$

$$C_2(x_2, y_2) = (0, 1.2)$$

$$C_3(x_3, y_3) = (30, 0.27)$$

Figure 3:
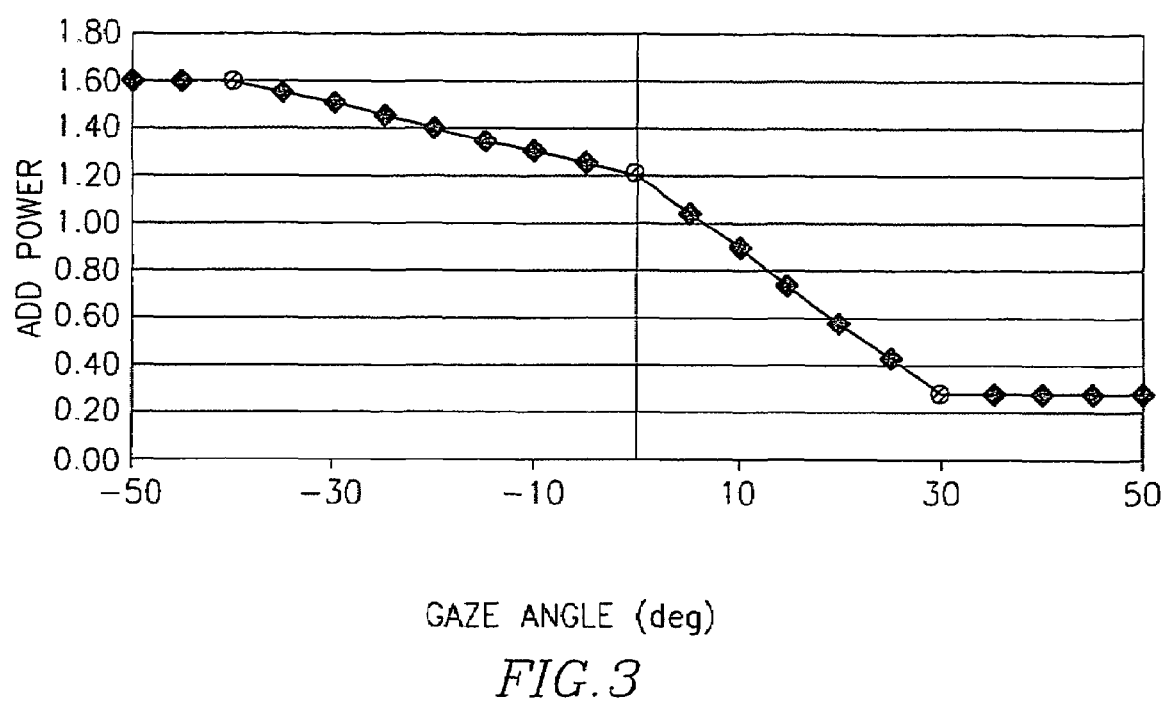
FIG. 3 is a schematic illustration of a personalized power-profile graph depicting power-add values as a function of gaze angles, respectively, in accordance with an exemplary embodiment of the invention.

The personalized power profile of the user may then be determined based on the control points, e.g., using any desired interpolation method. FIG. 3 illustrates a personalized power-profile graph depicting the power-add values as a function of gaze angles based on the three control points $C_1(x_1, y_1)$, $C_2(x_2, y_2)$, and $C_3(x_3, y_3)$.

Figure 4:
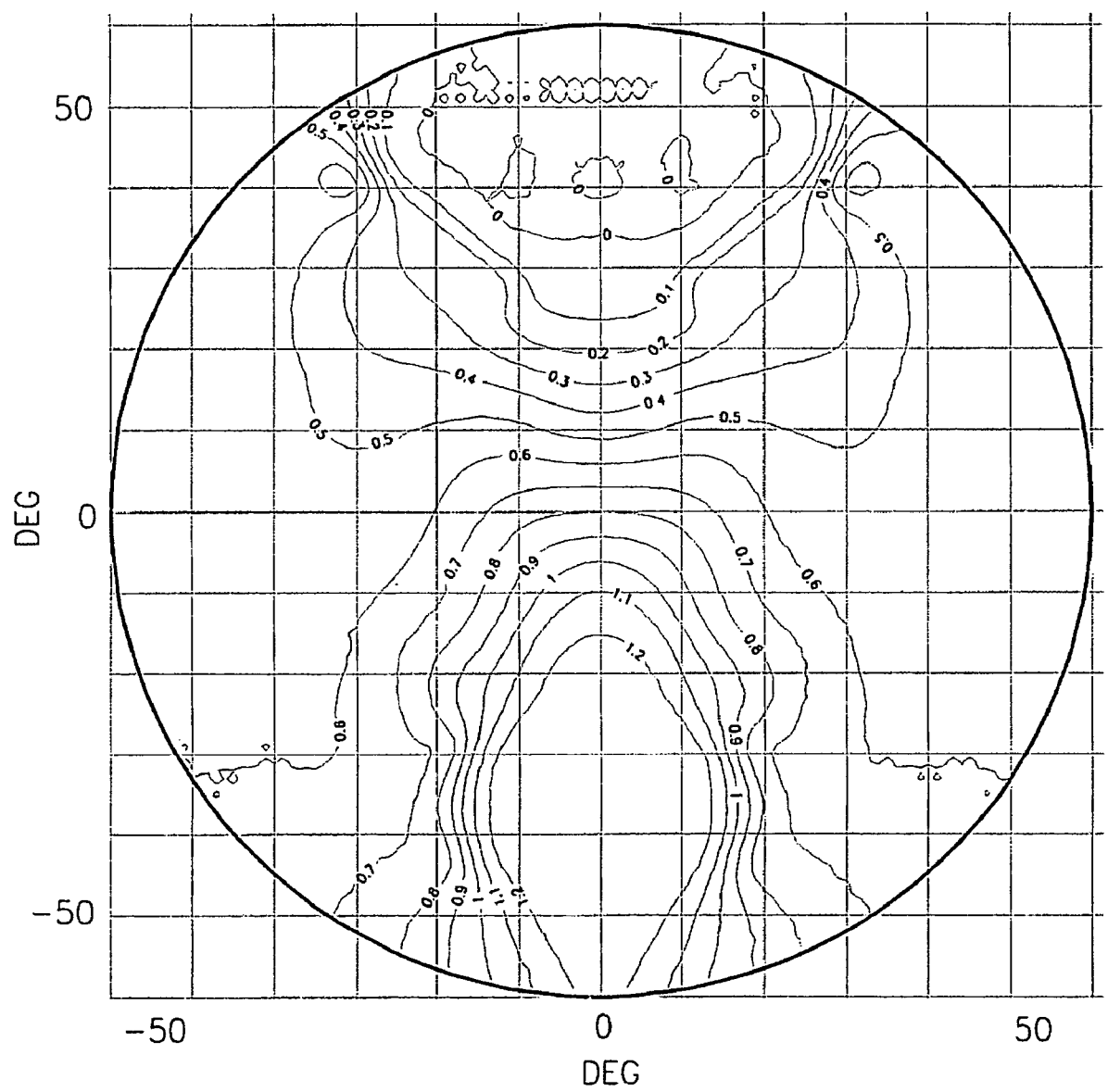
FIG. 4 is a schematic illustration of a customized spectacle lens surface generated based on the personalized power profile of FIG. 3.

According to some exemplary embodiments of the invention, target surface data may be generated based on the power profile of FIG. 3, and a customized spectacle lens may be produced by providing a lens producing module, e.g., lens producing module 104 (FIG. 1), with the target surface data. FIG. 4 illustrates a customized spectacle lens surface generated based on the personalized power profile of FIG. 3.

According to another exemplary embodiment of the invention, an intended user may have a far vision prescription of +0.5 D, and a near vision prescription of +2.5 D, e.g., equal to the vision prescriptions described in the previous example. The personalized short-distance viewing environment may include, for example, an office room including a first control point corresponding to a keyboard intended to be viewed by the user at a personalized distance of 0.4 m, and a personalized gaze angle of −40°; a second control point corresponding to a monitor intended to be viewed by the user at a personalized distance of 0.8 m, and a personalized gaze angle of −40°; and a third control point corresponding to an object in the room, e.g., a wall a file cabinet, a book shelf, or a person, intended to be viewed by the user at a personalized distance of 2 m, and a personalized gaze angle of +30°. The third control point may correspond, for example, to an object, e.g., a wall, intended to be located relatively far from the intended user, e.g., compared to other objects in the personalized viewing environment.

Accordingly, the values of the three control points $C_1(x_1, y_1)$, $C_2(x_2, y_2)$, and $C_3(x_3, y_3)$ may be determined, e.g., using Equation 3. For example, the following values may be determined for the three control points:

$$C_1(x_1, y_1) = (-40, 2.5)$$

$$C_2(x_2, y_2) = (0, 1.25)$$

$$C_3(x_3, y_3) = (30, 0.5)$$

Figure 5:
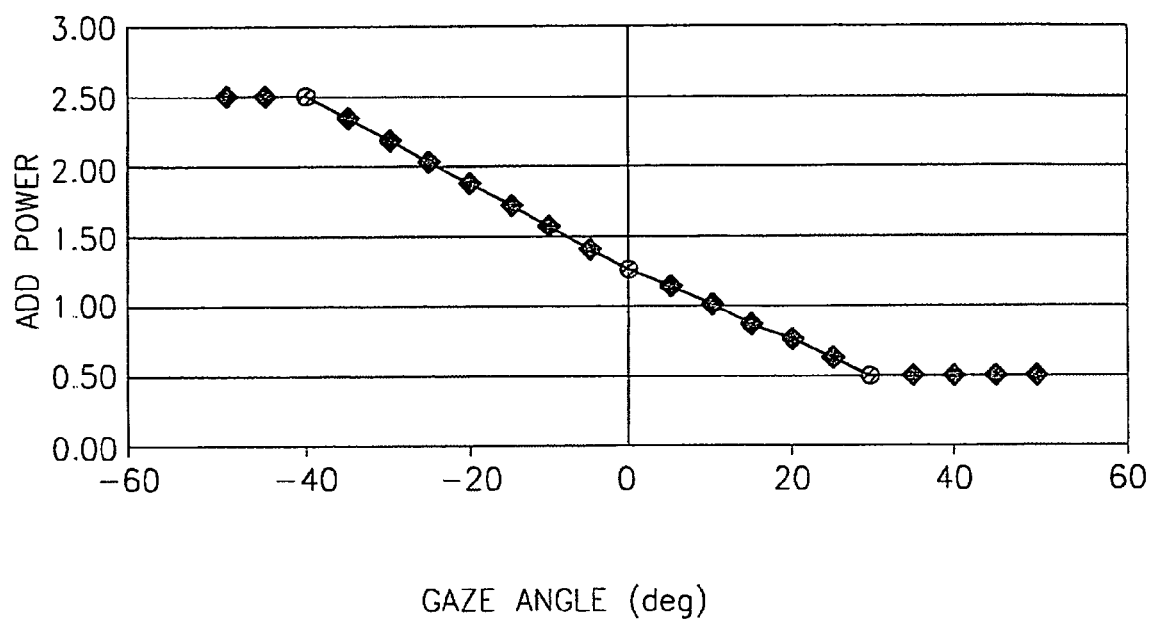
FIG. 5 is a schematic illustration of a personalized power-profile graph depicting power-add values as a function of gaze angles, respectively, in accordance with another exemplary embodiment of the invention.

The personalized power profile of the user may then be determined based on the control points, e.g., using any desired interpolation method. FIG. 5 illustrates a power-profile graph depicting the power-add values as a function of gaze angles based on the three control points $C_1(x_1, y_1)$, $C_2(x_2, y_2)$, and $C_3(x_3, y_3)$.

Although the scope of the present invention is not limited in this respect, for clarity, the description of some exemplary embodiments of the present invention relates to a customized lens for use in a personalized short-distance viewing environment. However, other embodiments of the invention may include customized lenses for use in any desired personalized viewing environment, e.g., a personalized long-distance viewing environment or a personalized mixed-distance viewing environment, e.g., as described below.

According to yet another exemplary embodiment of the invention, an intended user may have a far vision prescription of −2 D, and a near vision prescription of −0.5 D. The personalized viewing distance may include, for example, a personalized mixed-distance viewing environment. The personalized mixed-distance viewing environment may include, for example, a personalized driving viewing environment intended to be viewed by a driver of a vehicle. The personalized driving environment may include, for example, a first control point corresponding to a dashboard of the vehicle intended to be viewed by the user at a personalized distance of 0.6 m, and a personalized gaze angle of −25°; a second control point corresponding to a road portion in front of the vehicle intended to be viewed by the user at a personalized distance of 6 m, and a personalized gaze angle of −10°; and a third control point corresponding a desired full far power, e.g., an add power of zero, at a personalized gaze angle of 0°.

Accordingly, the personal add power of the intended user may be determined to be +1.5 D, e.g., using Equation 1. The personalized compensation factor of the intended user may be determined to be 0.6, e-g., using Equation 2. The values of the three control points $C_1(x_1, y_1)$, $C_2(x_2, y_2)$, and $C_3(x_3, y_3)$ may be determined, e.g., using Equation 3. For example, the following values may be determined for the three control points:

$$C_1(x_1, y_1)=(-25,1)$$

$$C_2(x_2, y_2)=(-10,0.1)$$

$$C_3(x_3, y_3)=(0,0)$$

Figure 6:
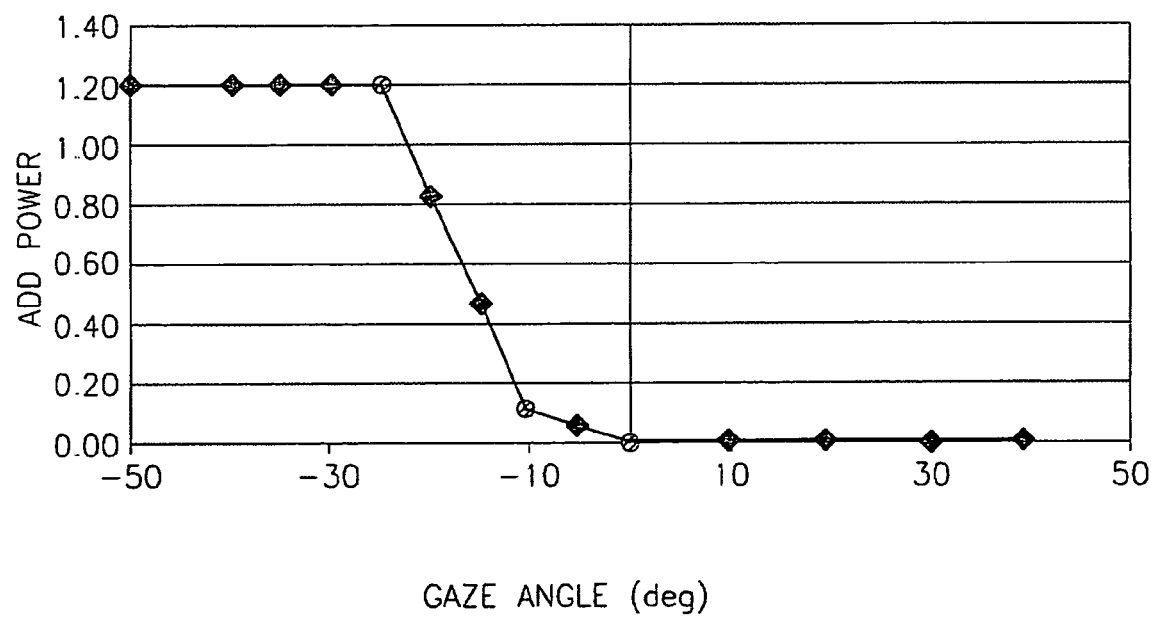
FIG. 6 is a schematic illustration of a personalized power-profile graph depicting power-add values as a function of gaze angles, respectively, in accordance with another exemplary embodiment of the invention.

The personalized power profile of the user may then be determined based on the control points, e.g., using any desired interpolation method. FIG. 6 illustrates a personalized power-profile graph depicting the power-add values as a function of gaze angles based on the three control points $C_1(x_1, y_1)$, $C_2(x_2, y_2)$, and $C_3(x_3, y_3)$.

According to some exemplary embodiments of the invention, target surface data may be generated based on the power profile of FIG. 6, and a customized spectacle lens may be produced by providing a lens producing module, e.g., lens producing module 104 (FIG. 1), with the target surface data.

The exemplary embodiments of FIGS. 3, 5 and 6 demonstrate that different power profiles may be determined corresponding to different personalized viewing environment of one or more intended users. Thus, according to exemplary embodiments of the invention, different customized spectacle lenses may be produced corresponding to the different personalized power profiles.

It will be appreciated by those skilled in the art that the customized lenses according to embodiments of the invention may have improved optical properties, for example, a lower level of optical aberrations, compared to non-customized multi-focal lenses, e.g., conventional multi-focal lenses.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method of producing a customized spectacle lens for use in a personalized viewing environment the method comprising:
   determining a personalized power profile of an intended user based on at least a far vision prescription of said user, a near vision prescription of said user, and one or more customized control points selected based on viewing preferences of an intended user, said one or more control points corresponding to one or more objects in said personalized viewing environment, each control point including a gaze angle and a distance; and
   generating target surface data suitable for producing said customized spectacle lens based on said personalized power profile.

2. The method of claim 1, wherein determining said personalized power profile comprises:
   determining a personalized compensation factor based on said far vision prescription and said near vision prescription; and
   determining first and second coordinates of a point in said personalized power profile corresponding to one of said one or more control points based on said personalized compensation factor and the customized values of said personalized gaze angle and said personalized distance.

3. The method of claim 2, wherein determining said personalized compensation factor comprises:
   determining a personal add power of said user by determining a difference between said near vision prescription and said far vision prescription; and
   determining said compensation factor as a ratio between said personal add power and a full accommodation level.

4. The method of claim 2, wherein determining the first and second coordinates corresponding to said one of said one or more control points comprises:
   determining said first coordinate according to the value of said personalized gaze angle; and
   determining said second coordinate by multiplying an inverse of said personalized distance by said personalized compensation factor.

5. The method of claim 1 comprising producing said customized spectacle lens based on said target surface data.

6. The method of claim 1, wherein said personalized viewing environment comprises a personalized short-distance viewing environment.

7. The method of claim 6, wherein said short-distance viewing environment comprises a well defined space, and wherein said one ore more objects comprise an object selected from the group consisting of a display, a keyboard, a file cabinet, a bookshelf, a blackboard, a whiteboard, a posting board, a note pad, a person, and a wall.

8. The method of claim 1, wherein said personalized viewing environment comprises a personalized mixed-distance viewing environment.

9. A system for producing a customized spectacle lens for use in a personalized viewing environment, the system comprising:
   a lens customizing module to determine a personalized power profile of an intended user based on at least a far vision prescription of said user, a near vision prescription of said user, and one or more customized control points selected based on viewing preferences of an intended user, said one or more control points corresponding to one or more objects in said personalized viewing environment, each control point including a gaze angle and a distance, and to generate target surface data suitable for producing said customized spectacle lens based on said personalized power profile.

10. The system of claim 9 comprising a lens production module to produce said customized spectacle lens based on said target surface data.

11. The system of claim 9, wherein said lens customizing module comprises a power profile module able to determine said personalized power profile by:
   determining a personalized compensation factor based on said far vision prescription and said near vision prescription; and
   determining first and second coordinates of a point in said personalized power profile corresponding to one of said one or more control points based on said personalized compensation factor and the customized values of said personalized gaze angle and said personalized distance.

12. The system claim 11, wherein said power profile module is able to determine said personalized compensation factor by:
   determining a personal add power of said user by determining a difference between said near vision prescription and said far vision prescription; and
   determining said compensation factor as a ratio between said personal add power and a full accommodation level.

13. The system of claim 11, wherein said power profile module is able to determine the first and second coordinates corresponding to said one of said one or more control points by:
   determining said first coordinate according to the value of said personalized gaze angle; and
   determining said second coordinate by multiplying an inverse of said personalized distance by said personalized compensation factor.

14. The system of claim 9, wherein said lens customizing module comprises a target surface module to generate said target surface data based on said personalized power profile.

15. The system of claim 9, wherein said personalized viewing environment comprises a personalized short-distance viewing environment.

16. The system of claim 15, wherein said short-distance viewing environment comprises a well defined space, and wherein said one or more objects comprise an object selected from the group consisting of a display, a keyboard, a file cabinet, a bookshelf, a blackboard, a whiteboard, a posting board, a note pad, a person, and a wall.

17. The system of claim 9, wherein said personalized viewing environment comprises a personalized mixed-distance viewing environment.

18. A spectacle lens for use in a personalized viewing environment, the lens comprising:
   a surface shaped in accordance with a personalized surface scheme, which is based at least in part on one or more customized control points selected based on viewing preferences of an intended user, said one or more control points corresponding to one or more objects in said personalized viewing environment, each control point including a gaze angle and a distance.

19. The spectacle lens of claim 18, wherein said personalized viewing environment comprises a personalized short-distance viewing environment.

20. The spectacle lens of claim 19, wherein said short-distance viewing environment comprises a well defined space, and wherein said one or more objects comprise an object selected from the group consisting of a display, a keyboard, a file cabinet, a bookshelf, a blackboard, a whiteboard, a posting board, a note pad, a person, and a wall.

21. The spectacle lens of claim 18, wherein said personalized surface scheme is based at least in part on a personalized power profile, wherein first and second coordinates of a point in said personalized power profile are determined based on at least a far vision prescription of said intended user, a near vision prescription of said intended user, and one of said one or more control points.

22. The spectacle lens of claim 18, wherein said personalized viewing environment comprises a personalized mixed-distance viewing environment.

23. The spectacle lens of claim 18, wherein said personalized surface scheme is further based at least in part on a personalized compensation factor based on a far vision prescription and a near vision prescription, and on first and second coordinates of a point corresponding to one of said one or more customized control points based on said personalized compensation factor.

24. The spectacle lens of claim 23, wherein said personalized surface scheme is further based at least in part on a personal add power of said intended user based on a difference between said near vision prescription and said far vision prescription, and wherein said compensation factor is a ratio between said personal add power and a full accommodation level.

25. The spectacle lens of claim 23, wherein the first coordinate is determined according to the value of said personalized gaze angle, and said second coordinate is determined by multiplying an inverse of said personalized distance by said personalized compensation factor.

* * * * *